United States Patent
Lung et al.

(10) Patent No.: US 10,069,520 B2
(45) Date of Patent: Sep. 4, 2018

(54) MULTIMODE TERMINAL

(71) Applicant: Huawei Technologies Co., Ltd., Shenzhen (CN)

(72) Inventors: Hsingyu Lung, Shanghai (CN); Chien-Jen Huang, Shanghai (CN); Yuan-Hao Lan, Shanghai (CN); Shengchang Shangguan, Shanghai (CN); Xinwei Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/566,574

(22) PCT Filed: Apr. 14, 2015

(86) PCT No.: PCT/CN2015/076540
§ 371 (c)(1),
(2) Date: Oct. 13, 2017

(87) PCT Pub. No.: WO2016/165068
PCT Pub. Date: Oct. 20, 2016

(65) Prior Publication Data
US 2018/0138931 A1  May 17, 2018

(51) Int. Cl.
*H04B 1/00* (2006.01)
*H04W 88/06* (2009.01)
*H04L 27/00* (2006.01)

(52) U.S. Cl.
CPC ....... *H04B 1/0064* (2013.01); *H04L 27/0002* (2013.01); *H04W 88/06* (2013.01)

(58) Field of Classification Search
CPC ........ H04B 7/022; H04B 7/04; H04B 7/0404; H04B 7/06–7/0888; H04B 1/0064; H04W 88/06; H04L 27/0002
See application file for complete search history.

(56) References Cited

U.S. PATENT DOCUMENTS 9,178,557 B2 * 11/2015 Wu ................... H04B 1/401
2006/0025171 A1   2/2006 Ly et al.
(Continued)

FOREIGN PATENT DOCUMENTS

| CN | 101330691 A | 12/2008 |
| CN | 101826884 A | 9/2010 |
| CN | 102857999 A | 1/2013 |

OTHER PUBLICATIONS

Machine Translation and Abstract of Chinese Publication No. CN101330691, Dec. 24, 2008, 17 pages.
(Continued)

*Primary Examiner* — Raymond Dean
(74) *Attorney, Agent, or Firm* — Conley Rose, P.C.

(57) ABSTRACT

A multimode terminal includes a first modem chip, a second modem chip, a switch connected to both the modem chips, and at least two antennas connected to the switch. The first modem chip includes an antenna selection apparatus configured to select an optimum antenna for the first modem chip, control the switch to connect the first modem chip to the optimum antenna of the first modem chip, determine an optimum antenna of the second modem chip according to a related parameter value of a signal received or transmitted by the second modem chip, and control the switch to connect the second modem chip to the optimum antenna of the second modem chip. The second modem chip includes a measurement apparatus configured to measure the related parameter value of the signal received or transmitted by the second modem chip.

7 Claims, 3 Drawing Sheets

(56) References Cited

U.S. PATENT DOCUMENTS

| | | | | |
|---|---|---|---|---|
| 2009/0061715 A1* | 3/2009 | Evans | ............... | H04B 7/0602 |
| | | | | 442/301 |
| 2014/0187284 A1* | 7/2014 | Sanchez | ............ | H04B 7/0814 |
| | | | | 455/550.1 |
| 2014/0301493 A1 | 10/2014 | Govindswamy et al. | | |
| 2014/0315497 A1 | 10/2014 | Wu et al. | | |
| 2015/0105074 A1 | 4/2015 | Hu et al. | | |

OTHER PUBLICATIONS

Machine Translation and Abstract of Chinese Publication No. CN101826884, Sep. 8, 2010, 13 pages.

Foreign Communication From a Counterpart Application, PCT Application No. PCT/CN2015/076540, English Translation of International Search Report dated Jan. 11, 2016, 2 pages.

Foreign Communication From a Counterpart Application, PCT Application No. PCT/CN2015/076540, English Translation of Written Opinion dated Jan. 11, 2016, 7 pages.

Foreign Communication From a Counterpart Application, European Application No. 15888773.7, Extended European Search Report dated Jan. 26, 2018, 10 pages.

\* cited by examiner

MULTIMODE TERMINAL

CROSS-REFERENCE TO RELATED APPLICATION

This application is a U.S. National Stage of International Patent Application No. PCT/CN2015/076540 filed on Apr. 14, 2015, which is hereby incorporated by reference in its entirety.

TECHNICAL FIELD

The present disclosure relates to the field of communications technologies, and in particular, to a multimode terminal.

BACKGROUND

With development of wireless communications technologies, there appear more wireless communication standards, for example, a Global System for Mobile Communications (GSM), a Total Access Communication System (TACS), a Wideband Code Division Multiple Access (WCDMA) system, a Code Division Multiple Access (CDMA) system, a Code Division Multiple Access 2000 (CDMA 2000) system, Time Division-Synchronous Code Division Multiple Access (TD-SCDMA), Long Term Evolution (LTE), Worldwide Interoperability for Microwave Access (WIMAX), a wireless local area network (WLAN), and BLUETOOTH. These communication standards have advantages and disadvantages in various aspects such as a transmission rate, a coverage area, a network construction cost, and security. To embrace the advantages of the various communication standards, a terminal that integrates multiple communication standards appears in recent years. The terminal may be referred as a multimode terminal, and may simultaneously support the multiple communication standards in order to achieve compatibility to multiple networks.

Generally, the multimode terminal may configure multiple modem chips (modem) and multiple antennas. The modem chips may correspond to one communication standard in order to perform data transmission and communication using the communication standard, and during a communications process, select optimum antennas according to requirements to transmit and receive signals. To enable each modem chip to select an optimum antenna, in the other approaches, an antenna selection module configured to select the optimum antenna is configured on each modem chip. For example, a Simultaneous Voice and LTE shown in FIG. 1 is used. An antenna selection module is configured on an LTE modem chip. An antenna selection module is configured on a CDMA modem chip. The LTE modem chip connected to a radio frequency transceiver, and the CDMA modem chip is connected to a radio frequency transceiver. The radio frequency transceivers are connected to a double-pole double-throw (DPDT) switch, separately. The DPDT is connected to an antenna (such as antenna 1 or antenna 3) in order to establish a channel between a modem chip and an optimum antenna. If the antenna selection module in the LTE modem chip obtains by means of calculation that a current optimum antenna in an LTE standard is an antenna 1, the DPDT is controlled to connect the LTE modem chip to the antenna 1 such that a signal generated by the LTE modem chip is converted into an LTE radio frequency signal using the radio frequency transceiver and the LTE radio frequency signal is transmitted and received by the antenna 1. Similarly, when the antenna selection module in the CDMA modem chip obtains by means of calculation that a current optimum antenna in a CDMA standard is the antenna 1, the DPDT is controlled to connect the CDMA modem chip to the antenna 1 such that a signal generated by the CDMA modem chip is converted into a CDMA radio frequency signal using the radio frequency transceiver and the CDMA radio frequency signal is transmitted and received by the antenna 1.

In a process of implementing embodiments of the present disclosure, the inventor finds that at least the following problem exists in other approaches. For the multimode terminal in the other approaches, to support selection of an optimum antenna in multiple communication standards, an antenna selection module needs to be configured on a modem chip of each standard, resulting in a high development cost.

SUMMARY

Embodiments of the present disclosure provide a multimode terminal in order to resolve a problem of high costs of a multimode terminal.

To achieve the foregoing objective, the following technical solutions are used in the embodiments of the present disclosure.

According to a first aspect, an embodiment of the present disclosure provides a multimode terminal, including a first modem chip, a second modem chip, a switch module connected to both the modem chips, and at least two antennas connected to the switch module, where the first modem chip includes an antenna selection module configured to select an optimum antenna for the first modem chip, and control the switch module to connect the first modem chip to the optimum antenna of the first modem chip. The second modem chip includes a measurement unit, where the measurement unit is configured to measure a related parameter value of a signal received or transmitted by the second modem chip, where the related parameter value of the signal received or transmitted by the second modem chip is used to determine an optimum antenna of the second modem chip, and the antenna selection module is further configured to determine the optimum antenna of the second modem chip according to the related parameter value of the signal received or transmitted by the second modem chip, and control the switch module to connect the second modem chip to the optimum antenna of the second modem chip.

In a first implementation of the first aspect, with reference to the first aspect, the second modem chip further includes a criteria operation unit configured to receive the related parameter value that is of the signal received or transmitted by the second modem chip and that is measured by the measurement unit, and send, to the first modem chip, the related parameter value of the signal received or transmitted by the second modem chip when the related parameter value of the signal received or transmitted by the second modem chip meets a preset condition.

In a second implementation of the first aspect, with reference to the first aspect or the first implementation of the first aspect, the antenna selection module includes a first measurement unit, a first configuration unit, and a first execution unit. The first measurement unit is configured to measure a related parameter value of a signal received or transmitted by the first modem chip. The first configuration unit is configured to configure the optimum antenna for the first modem chip according to the related parameter value of the signal received or transmitted by the first modem chip, and determine the optimum antenna of the second modem chip according to the related parameter value of the signal received or transmitted by the second modem chip, and the first execution unit is configured to control the switch module to connect the first modem chip to the optimum antenna of the first modem chip, and control the switch module to connect the second modem chip to the optimum antenna of the second modem chip.

In a third implementation of the first aspect, with reference to any implementation of the first aspect to the second implementation of the first aspect, the multimode terminal further includes a communications interface, and the communications interface is located between the first modem chip and the second modem chip, and is configured to transmit data between the first modem chip and the second modem chip.

According to a second aspect, an embodiment of the present disclosure provides a multimode terminal, including a first modem chip, a second modem chip, a switch module connected to both the modem chips, and at least two antennas connected to the switch module, where the first modem chip includes an antenna selection module configured to select an optimum antenna for the first modem chip, and control the switch module to connect the first modem chip to the optimum antenna of the first modem chip. The second modem chip includes a measurement unit and a configuration unit. The measurement unit is configured to measure a related parameter value of a signal received or transmitted by the second modem chip, where the related parameter value is used to determine an optimum antenna of the second modem chip. The configuration unit is configured to determine the optimum antenna of the second modem chip according to the related parameter value of the signal received or transmitted by the second modem chip, and the antenna selection module is further configured to control, according to the optimum antenna that is of the second modem chip and that is determined by the configuration unit, the switch module to connect the second modem chip to the optimum antenna of the second modem chip.

In a first implementation of the second aspect, with reference to the second aspect, the antenna selection module includes a first measurement unit, a first configuration unit, and a first execution unit. The first measurement unit is configured to measure a related parameter value of a signal received or transmitted by the first modem chip. The first configuration unit is configured to configure the optimum antenna for the first modem chip according to the related parameter value of the signal received or transmitted by the first modem chip, and the first execution unit is configured to control the switch module to connect the first modem chip to the optimum antenna of the first modem chip, and control, according to the optimum antenna that is of the second modem chip and that is determined by the configuration unit, the switch module to connect the second modem chip to the optimum antenna of the second modem chip.

In a second implementation of the second aspect, with reference to the second aspect or the first implementation of the second aspect, the multimode terminal further includes a communications interface, and the communications interface is located between the first modem chip and the second modem chip, and is configured to transmit data between the first modem chip and the second modem chip.

It can be known from above that the embodiments of the present disclosure provide a multimode terminal. Modules that control a switch module to connect at least one modem chip to an optimum antenna are disposed on a same modem chip. Compared with that in an existing multimode terminal, a module that controls connection of each modem chip to an optimum antenna of the modem chip needs to be disposed on the modem chip, a production cost and system complexity are greatly reduced. Moreover, a problem that antenna selection algorithms of multiple modem chips are leaked to each other when the chips control a same switch module no longer exists, thereby effectively reducing system risks.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that a multimode terminal discussed in the present disclosure can simultaneously support multiple standards. The multiple standards may include at least two of the following standards a GSM, a TACS, a WCDMA system, a CDMA system, a CDMA 2000 system, TD-SCDMA, an LTE, WIMAX, a WLAN, and BLUETOOTH. With ongoing development of communications technologies, the multimode terminal may further support newly added standards of other types.

Embodiment 1

Figure 1:
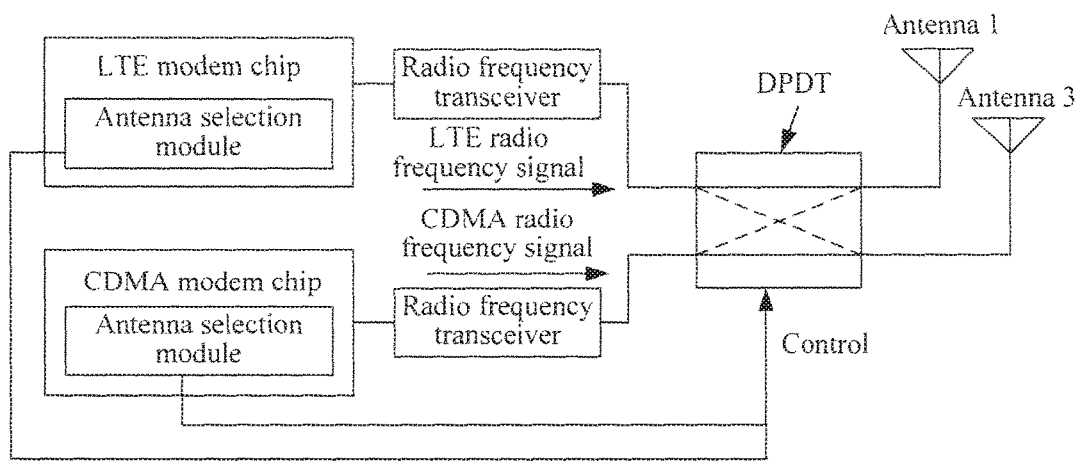
FIG. 1 is a structural diagram of a dual-mode terminal.
Figure 2A:
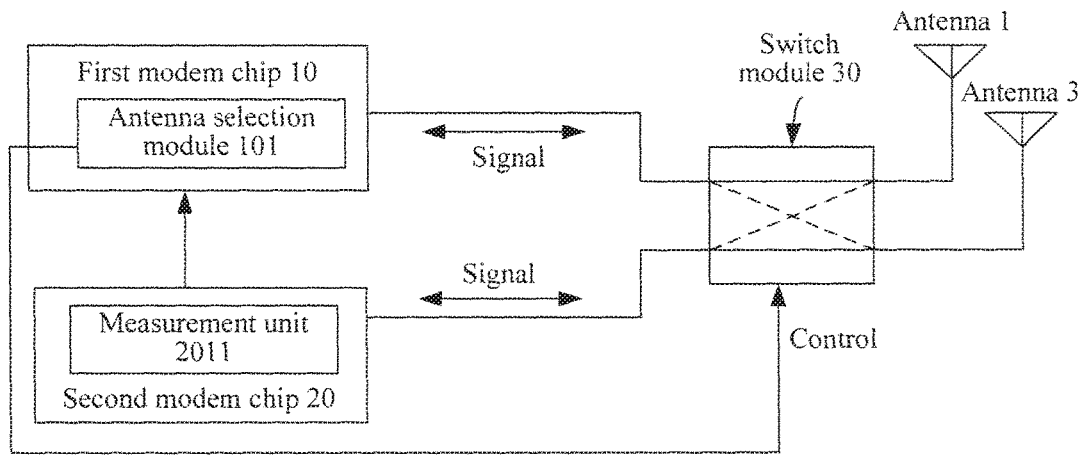
FIG. 2A is a structural diagram of a multimode terminal according to an embodiment of the present disclosure.

FIG. 2A is a structural diagram of a multimode terminal according to an embodiment of the present disclosure. As shown in FIG. 2A, the multimode terminal may include a first modem chip 10, at least one second modem chip 20, a switch module 30 connected to all modem chips, and at least two antennas (such as antenna 1 and antenna 3) connected to the switch module 30.

The modem chips 10 and 20 may be a communications chip of a single standard, or may be a communications chip that integrates a group of standards, for example, a communications chip that integrates the LTE standard, the WCDMA standard, and the GSM standard. The switch module 30 may be a multiple-selection switch which can connect the modem chips 10 and 20 to any antenna, for example, may be a single-pole double-throw switch.

The first modem chip 10 may be any modem chip in the multimode terminal, supports a first communication standard, and includes an antenna selection module 101 configured to select an optimum antenna for the first modem chip 10 from the at least two antennas, and control the switch module 30 to connect the first modem chip 10 to the optimum antenna of the first modem chip 10.

The second modem chip 20 may be any modem chip other than the first modem chip 10 in the multimode terminal, and may support a second communication standard. Compared with an existing modem chip, the second modem chip 20 does not have an antenna selection module configured to control the switch module 30 to connect the second modem chip 20 to an optimum antenna of the second modem chip 20, but may include at least a measurement unit 2011 configured to measure a related parameter value of a signal received or transmitted by the second modem chip 20. The related parameter value is used to determine the optimum antenna of the second modem chip 20.

Optionally, the measurement unit 2011 may periodically measure the related parameter value of the signal received or transmitted by the second modem chip 20. The related parameter value may include strength of the signal, quality of the signal, and the like. Moreover, related parameter values in different standards are different. For example, the related parameter value in the LTE standard may be a reference signal received power (RSRP), a reference signal receiving quality (RSRQ), or a block error rate (BLER). The related parameter value in the GSM standard may be a received signal strength indication (RSSI).

Although the second modem chip 20 does not have the antenna selection module configured to control the switch module 30 to connect the second modem chip 20 to the optimum antenna of the second modem chip 20, the first modem chip 10 may be used as a proxy chip in order to control the switch module 30 to connect the second modem chip 20 to the optimum antenna of the second modem chip 20. Specific implementation is as follows.

The second modem chip 20 sends, to the first modem chip 10, the related parameter value of the signal received or transmitted by the second modem chip 20. The related parameter value may be transmitted using a communication channel between the first modem chip 10 and the second modem chip 20. The related parameter value of the signal received or transmitted by the second modem chip 20 is transmitted to the antenna selection module 101 in the first modem chip 10.

The antenna selection module 101 of the first modem chip 10 is further configured to determine the optimum antenna of the second modem chip 20 in the at least two antennas according to the related parameter value of the signal received or transmitted by the second modem chip 20, and control the switch module 30 to connect the second modem chip 20 to the optimum antenna of the second modem chip 20.

Figure 2B:
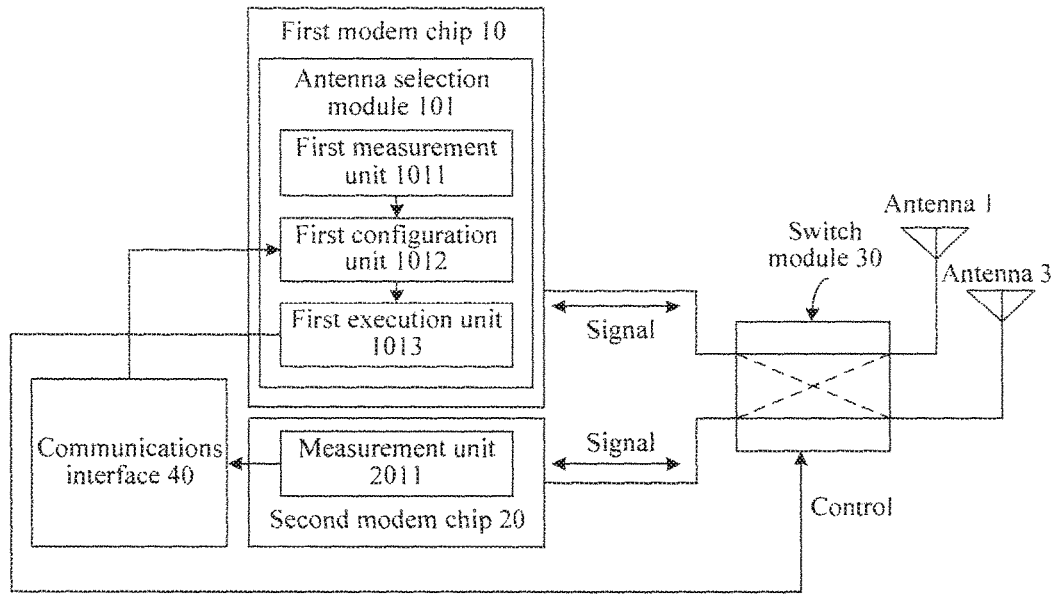
FIG. 2B is a structural diagram of a multimode terminal according to an embodiment of the present disclosure.

Further, based on FIG. 2A, for the multimode terminal shown in FIG. 2B, the antenna selection module 101 disposed on the first modem chip 10 may include a first measurement unit 1011, a first configuration unit 1012, and a first execution unit 1013. Moreover, using these units, the optimum antenna for the first modem chip 10 is selected, the switch module 30 is controlled to connect the first modem chip 10 to the optimum antenna of the first modem chip 10, the optimum antenna of the second modem chip 20 is determined, and the switch module 30 is controlled to connect the second modem chip 20 to the optimum antenna of the second modem chip 20.

The first measurement unit 1011 is configured to measure a related parameter value of a signal received or transmitted by the first modem chip 10.

The first configuration unit 1012 is configured to configure the optimum antenna for the first modem chip 10 according to the related parameter value of the signal received or transmitted by the first modem chip 10, and configure the optimum antenna for the second modem chip 20 according to the related parameter value of the signal received or transmitted by the second modem chip 20.

The first execution unit 1013 is configured to control the switch module 30 to connect the first modem chip 10 to the optimum antenna of the first modem chip 10, and control the switch module 30 to connect the second modem chip 20 to the optimum antenna of the second modem chip 20.

As shown in FIG. 2B, the second modem chip 20 includes the measurement unit 2011 configured to measure the related parameter value of the signal received or transmitted by the second modem chip 20.

The multimode terminal may further include a communications interface 40. The communications interface 40 may be located between the modem chips 10 and 20 and used as a communication channel between the modem chips 10 and 20 to implement data transmission between the modem chips 10 and 20. In addition, in the present disclosure, a communication channel may further be established between the modem chips 10 and 20 in another manner. For example, a communications interface is disposed on each modem chip 10 and 20. The communications interface on the first modem chip 10 is connected to a communications interface on the second modem chip 20 in order to form a communication channel between the modem chips 10 and 20. This is not limited in this embodiment of the present disclosure. In this embodiment of the present disclosure, only an example in which a communication channel is established between the modem chips 10 and 20 using the communications interface 40 is used for description.

The communications interface 40 is configured to send, to the first modem chip 10, the related parameter value of the signal received or transmitted by the second modem chip 20.

The second modem chip 20 sends, using the communications interface 40 to the first modem chip 10, the related parameter value of the signal received or transmitted by the second modem chip 20. The related parameter value of the signal received or transmitted by the second modem chip 20 is transmitted to the first configuration unit 1012 in the first modem chip 10.

Figure 2C:
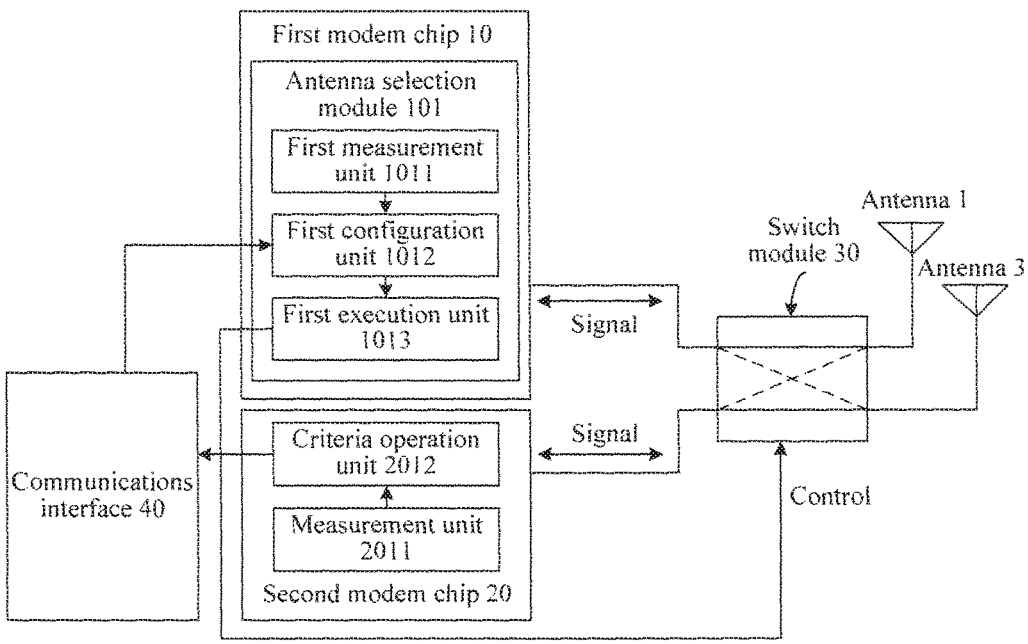
FIG. 2C is a structural diagram of a multimode terminal according to an embodiment of the present disclosure.

Optionally, to avoid a problem of frequent signaling because the related parameter value of the second modem chip 20 is instantly reported to the first modem chip 10 using the communications interface 40 after the measurement unit 2011 measures the related parameter value of the second modem chip 20. In this embodiment of the present disclosure, as shown in FIG. 2C, the second modem chip 20 may further include a criteria operation unit 2012.

The criteria operation unit 2012 is configured to receive the related parameter value that is of the signal received or transmitted by the second modem chip 10 and that is measured by the measurement unit 2011, determine whether the related parameter value of the signal received or transmitted by the second modem chip 20 meets a preset condition, and send, to the first modem chip 10, the related parameter value of the signal received or transmitted by the second modem chip 20 when the related parameter value of the signal received or transmitted by the second modem chip 20 meets the preset condition.

Further, the related parameter value of the signal received or transmitted by the second modem chip 20 may be sent to the first modem chip 10 using the communications interface 40. The related parameter value of the signal received or transmitted by the second modem chip 20 is transmitted to the first configuration unit 1012 in the first modem chip 10.

The preset condition may be set according to a communication standard corresponding to a modem chip. For example, if the second modem chip is an LTE chip, it may be defined that the preset condition in the LTE standard is that an RSRP is less than a RSRP threshold value being −90 decibel-milliwatts (dBm). When the criteria operation unit 2012 determines that the measured RSRP is less than the threshold value, the related parameter value is transmitted to the first modem chip 10 such that the first configuration unit 1012 configures the optimum antenna for the second modem chip 20 according to the related parameter value.

In this way, compared with the other approaches, the second modem chip 20 does not have the antenna selection module configured to control the switch module 30 to connect the second modem chip 20 to the optimum antenna of the second modem chip 20, but controls communication of the second modem chip 20 and the optimum antenna using the antenna selection module 10 on the first modem chip 10. Therefore, a design cost of the second modem chip 20 is reduced, and a production cost and a development cost of the multimode terminal are greatly reduced.

In addition, to configure the optimum antenna for the second modem chip 20 more accurately, the optimum antenna of the second modem chip 20 may further be configured by a unit inside a second modem chip in another multimode terminal provided in the present disclosure. The other multimode terminal provided in an embodiment of the present disclosure is described below using Embodiment 2.

Embodiment 2

Figure 3A:
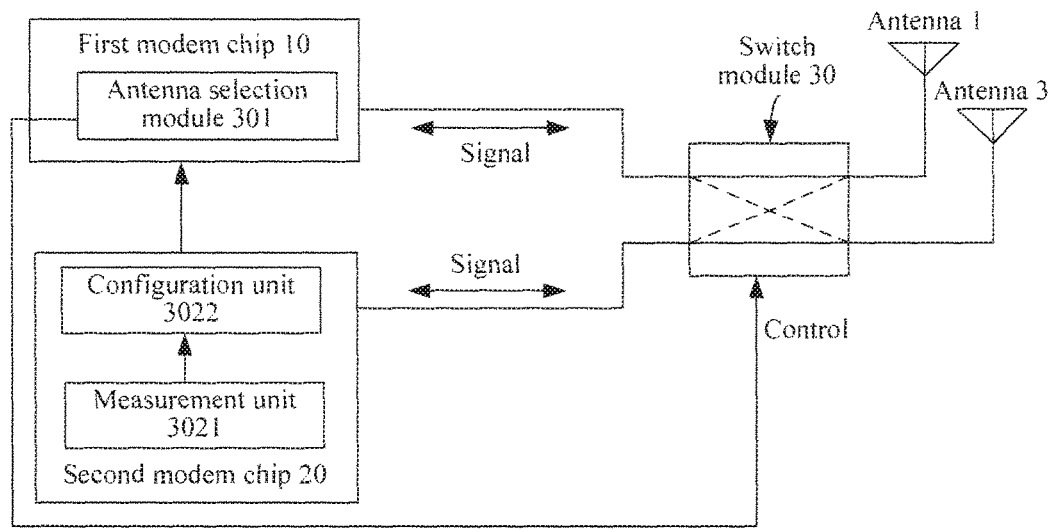
FIG. 3A is a structural diagram of another multimode terminal according to an embodiment of the present disclosure.

FIG. 3A is a structural diagram of another multimode terminal according to an embodiment of the present disclosure. As shown in FIG. 3A, the multimode terminal may include a first modem chip 10, at least one second modem chip 20, a switch module 30 connected to all modem chips 10 and 20, and at least two antennas (such as antenna land antenna 3) connected to the switch module 30.

The modem chips 10 and 20 may be a communications chip of a single standard, or may be a communications chip that integrates a group of standards, for example, a communications chip that integrates the LTE standard, the WCDMA standard, and the GSM standard. The switch module 30 may be a multiple-selection switch which can connect the modem chips 10 and 20 to any antenna, for example, may be a single-pole double-throw switch.

The first modem chip 10 may be any modem chip in the multimode terminal, supports a first communication standard, and includes an antenna selection module 301 configured to select an optimum antenna for the first modem chip 10 from the at least two antennas, and control the switch module 30 to connect the first modem chip 10 to the optimum antenna of the first modem chip 10.

The second modem chip 20 may be any modem chip other than the first modem chip 10 in the multimode terminal, and may support a second communication standard. Compared with an existing modem chip, the second modem chip 20 does not have an antenna selection module configured to control the switch module 30 to connect the second modem chip 20 to an optimum antenna of the second modem chip 20, but may include at least a measurement unit 3021 and a configuration unit 3022.

The measurement unit 3021 is configured to measure a related parameter value of a signal received or transmitted by the second modem chip 20. The related parameter value is used to determine an optimum antenna of the second modem chip 20.

The configuration unit 3022 is configured to determine, according to the related parameter value measured by the measurement unit 3021, the optimum antenna of the second modem chip 20, and generate a determining result. The determining result is used to indicate the optimum antenna of the second modem chip 20. The second modem chip 20 sends the determining result to the first modem chip 10. Further, the determining result may be transmitted using a communication channel between the first modem chip 10 and the second modem chip 20. The determining result is transmitted to the antenna selection module 301 in the first modem chip 10.

The antenna selection module 301 is further configured to control, according to the determining result, the switch module 30 to connect the second modem chip 20 to the optimum antenna of the second modem chip 20.

Optionally, the measurement unit 3021 may periodically measure the related parameter value of the signal received or transmitted by the second modem chip 20. The related parameter value may include strength of the signal, quality of the signal, and the like. Moreover, related parameter values in different standards are different. For example, the related parameter value in the LTE standard may be an RSRP, an RSRQ, or a BLER. The related parameter value in the GSM standard may be an RSSI.

Figure 3B:
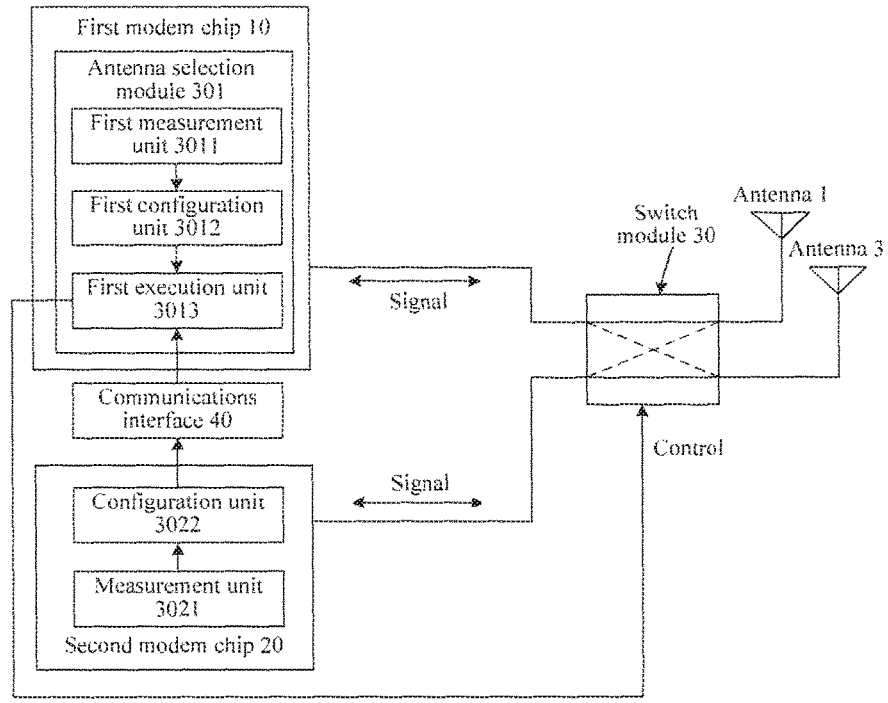
FIG. 3B is a structural diagram of another multimode terminal according to an embodiment of the present disclosure.

Based on FIG. 3A, as shown in FIG. 3B, the antenna selection module 301 disposed on the first modem chip 10 may include a first measurement unit 3011, a first configuration unit 3012, and a first execution unit 3013. Moreover, using these units, the optimum antenna is selected for the first modem chip 10, the switch module 30 is controlled to connect the first modem chip 10 to the optimum antenna of the first modem chip 10, and the switch module 30 is controlled to connect the second modem chip 20 to the optimum antenna of the second modem chip 20.

The first measurement unit 3011 is configured to measure a related parameter value of a signal received or transmitted by the first modem chip 10.

The first configuration unit 3012 is configured to configure the optimum antenna for the first modem chip 10 according to the related parameter value of the signal received or transmitted by the first modem chip 10.

The first execution unit 3013 is configured to control the switch module 30 to connect the first modem chip 10 to the optimum antenna of the first modem chip 10, and control, according to the determining result, the switch module 30 to connect the second modem chip 20 to the optimum antenna of the second modem chip 20.

As shown in FIG. 3B, the multimode terminal may further include a communications interface 40. The communications interface 40 may be located between the modem chips 10 and 20 and used as a communication channel between the modem chips 10 and 20 to implement data transmission between the modem chips 10 and 20. In addition, in the present disclosure, a communication channel may further be established between the modem chips 10 and 20 in another manner. For example, a communications interface is disposed on each modem chip 10 and 20. The communications interface on the first modem chip 10 is connected to a communications interface on the second modem chip 20 in order to form a communication channel between the modem chips 10 and 20. This is not limited in this embodiment of the present disclosure. In this embodiment of the present disclosure, only an example in which a communication channel is established between the modem chips using the communications interface 40 is used for description.

The communications interface 40 is configured to send the determining result to the first modem chip 10.

The second modem chip 20 sends the determining result to the first modem chip 10 using the communications interface 40, and the first modem chip 10 transmits the determining result to the first execution unit 3013. The first execution unit 3013 controls, according to the determining result, the switch module 30 to connect the second modem chip 20 to the optimum antenna of the second modem chip 20.

It can be known from above that the embodiments of the present disclosure provide a multimode terminal. Modules that control a switch module to connect at least one modem chip to an optimum antenna are disposed on a same modem chip. Compared with that in an existing multimode terminal, a module that controls connection of each modem chip to an optimum antenna of the modem chip needs to be disposed on the modem chip, a production cost and system complexity are greatly reduced. Moreover, a problem that antenna selection algorithms of multiple modem chips are leaked to each other when the chips control a same switch module no longer exists, thereby effectively reducing system risks.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A multimode terminal, comprising:
   a switch;
   at least two antennas coupled to the switch;
   a first modem chip coupled to the switch and comprising:
     a first memory comprising a first set of instructions; and
     a first processor coupled to the first memory, wherein the first set of instructions causes the first processor to be configured to:
       select an optimum antenna for the first modem chip; and
       control the switch to connect the first modem chip to the optimum antenna of the first modem chip; and
   a second modem chip coupled to the switch and comprising:
     a second memory comprising a second set of instructions; and
     a second processor coupled to the second memory, wherein the second set of instructions causes the second processor to be configured to measure a related parameter value of a signal received or transmitted by the second modem chip,
     wherein the related parameter value of the signal received or transmitted by the second modem chip determines an optimum antenna of the second modem chip, and
     wherein the first set of instructions further causes the first processor to be configured to:
       choose the optimum antenna of the second modem chip according to the related parameter value of the signal received or transmitted by the second modem chip; and
       control the switch to connect the second modem chip to the optimum antenna of the second modem chip.

2. The multimode terminal according to claim 1, wherein the second set of instructions further causes the second processor to be configured to send, to the first modem chip, the related parameter value of the signal received or transmitted by the second modem chip when the related parameter value of the signal received or transmitted by the second modem chip meets a preset condition.

3. The multimode terminal according to claim 1, wherein the first set of instructions further causes the first processor to be configured to:
   measure a related parameter value of a signal received or transmitted by the first modem chip;
   configure the optimum antenna for the first modem chip according to the related parameter value of the signal received or transmitted by the first modem chip;
   determine the optimum antenna of the second modem chip according to the related parameter value of the signal received or transmitted by the second modem chip;
   control the switch to connect the first modem chip to the optimum antenna of the first modem chip; and
   control the switch to connect the second modem chip to the optimum antenna of the second modem chip.

4. The multimode terminal according to claim 1, further comprising a communications interface located between the first modem chip and the second modem chip and configured to transmit data between the first modem chip and the second modem chip.

5. A multimode terminal, comprising:
   a switch;
   at least two antennas coupled to the switch;
   a first modem chip coupled to the switch and comprising:
     a first memory comprising a first set of instructions; and
     a first processor coupled to the first memory, wherein the first set of instructions causes the first processor to be configured to:
       select an optimum antenna for the first modem chip; and
       control the switch to connect the first modem chip to the optimum antenna of the first modem chip; and
   a second modem chip coupled to the switch and comprising:
     a second memory comprising a second set of instructions; and
     a second processor coupled to the second memory, wherein the second set of instructions causes the second processor to be configured to:
       measure a related parameter value of a signal received or transmitted by the second modem chip, wherein the related parameter value determines an optimum antenna of the second modem chip;
       determine the optimum antenna of the second modem chip according to the related parameter value of the signal received or transmitted by the second modem chip, and
     wherein the first set of instructions further causes the first processor to be configured to control, according to the optimum antenna of the second modem chip determined by the second processor, the switch to connect the second modem chip to the optimum antenna of the second modem chip.

6. The multimode terminal according to claim 5, wherein the first set of instructions further causes the first processor to be configured to:
  measure a related parameter value of a signal received or transmitted by the first modem chip;
  configure the optimum antenna for the first modem chip according to the related parameter value of the signal received or transmitted by the first modem chip;
  control the switch to connect the first modem chip to the optimum antenna of the first modem chip; and
  control, according to the optimum antenna of the second modem chip determined by the second processor, the switch to connect the second modem chip to the optimum antenna of the second modem chip.

7. The multimode terminal according to claim 5, further comprising a communications interface located between the first modem chip and the second modem chip and configured to transmit data between the first modem chip and the second modem chip.

* * * * *